US007762085B2

(12) United States Patent  (10) Patent No.: US 7,762,085 B2
Exley et al.  (45) Date of Patent: Jul. 27, 2010

(54) TURBINE ENGINE HAVING TWO OFF-AXIS SPOOLS WITH VALVING-ENABLED MODULATION BETWEEN HIGH AND LOW POWER MODES

(75) Inventors: John T. Exley, Toledo, OH (US); George Minkkinen, Perryburg, OH (US); Donald Hulbert, Petersburg, MI (US); Michael D. Rudy, Holland, OH (US)

(73) Assignee: Teledyne Technologies Incorporated, Thousand Oaks, CA (US)

( * ) Notice: Subject to any disclaimer, the term of this patent is extended or adjusted under 35 U.S.C. 154(b) by 1014 days.

(21) Appl. No.: 11/505,519

(22) Filed: Aug. 17, 2006

(65) Prior Publication Data
US 2010/0154435 A1  Jun. 24, 2010

Related U.S. Application Data

(60) Provisional application No. 60/710,223, filed on Aug. 22, 2005.

(51) Int. Cl.
*F02C 3/10* (2006.01)
(52) U.S. Cl. .......................... 60/792; 60/791
(58) Field of Classification Search .............. 60/791, 60/792, 39.17, 39.15, 39.25, 779, 39.091, 60/39.094, 587, 583; 220/745–750
See application file for complete search history.

(56) References Cited

U.S. PATENT DOCUMENTS 2,095,991 A * 10/1937 Lysholm ...................... 60/773

(Continued)

FOREIGN PATENT DOCUMENTS

DE  3816967 A1  12/1988

(Continued)

OTHER PUBLICATIONS

International Preliminary Report on Patentability for PCT/US2006/032299.

(Continued)

*Primary Examiner*—Michael Cuff
*Assistant Examiner*—Vikansha S Dwivedi
(74) *Attorney, Agent, or Firm*—K&L Gates LLP

(57) ABSTRACT

A turbine engine particularly suited for VTOL aircraft is disclosed. According to various embodiments, the core of the turbine engine includes two spools—a low pressure (LP) spool and a high pressure (HP) spool—where the LP spool is independently mounted remote to the HP spool. The engine may be modulated for operation by a modulation diverter valve assembly and through the fuel flow to the engine. The power output from the engine can be modulated from high levels to low levels and vice versa through control of the air flow through the engine using the modulation diverter valve assembly. In lift mode operation both the LP and HP spools may be operational, while during the forward flight cruise mode of operation the HP spool is operational and the LP spool may or may not be operational depending upon the power required for the flight condition. For HP spool only operation, the LP spool may be shut down using the modulation diverter valve assembly and an inlet flow diverter valve assembly. The convertible configuration may be achieved by the diverter valving-enabled modulation of the engine airflow direction to produce a characteristic for one embodiment having shaft power output for the vertical lift mode to propulsive thrust output for forward flight mode.

29 Claims, 5 Drawing Sheets

U.S. PATENT DOCUMENTS

| | | | |
|---|---|---|---|
| 2,622,392 A * | 12/1952 | Boestad et al. | 60/39.15 |
| 2,748,566 A | 6/1956 | Fletcher | |
| 3,813,874 A * | 6/1974 | Bruder et al. | 60/39.15 |
| 4,286,430 A | 9/1981 | Smith | |
| 4,845,944 A | 7/1989 | Rodgers | |
| 5,081,832 A | 1/1992 | Mowill | |
| 5,572,862 A | 11/1996 | Mowill | |
| 5,924,276 A | 7/1999 | Mowill | |
| 5,937,633 A | 8/1999 | Wang | |
| 6,327,860 B1 | 12/2001 | Critchley | |
| 6,735,951 B2 | 5/2004 | Thompson | |
| 6,901,759 B2 | 6/2005 | Frutschi | |
| 6,925,809 B2 | 8/2005 | Mowill | |
| 2002/0148227 A1 | 10/2002 | Mackay | |
| 2006/0150633 A1 | 7/2006 | McGinley et al. | |

FOREIGN PATENT DOCUMENTS

| | | |
|---|---|---|
| EP | 1 362 984 A2 | 11/2003 |
| GB | 1545 365 A | 5/1979 |

OTHER PUBLICATIONS

Written Opinion of the International Searching Authority for PCT/US2006/032299.

International Search Report for PCT/US2006/032299.

\* cited by examiner

TURBINE ENGINE HAVING TWO OFF-AXIS SPOOLS WITH VALVING-ENABLED MODULATION BETWEEN HIGH AND LOW POWER MODES

CROSS REFERENCE TO RELATED APPLICATIONS

This application claims priority under 35 U.S.C. §119(e) to U.S. provisional patent application Ser. No. 60/710,223, filed Aug. 22, 2005, entitled "Turbine Engine Having Two Off-Axis Spools With Valving-Enabled Modulation Between High And Low Power Modes," listing as inventors John T. Exley, George Minkkinen, Donald Hulbert, and Michael D. Rudy, which is incorporated herein by reference.

BACKGROUND

Conventional helicopter Vertical Take-Off and Landing (VTOL) aircraft configurations are generally limited to fewer than 170 knots for flight speed but can lift large loads. Present tilt rotor VTOL aircraft configurations have an intermediate flight speed capability at 300 knots but less lift capability than a helicopter. A conventional lift fan VTOL aircraft has capability for high-speed flight at over 400 knots but with further reduced lift load capability. A lift fan VTOL also can be more survivable, but ordinarily has required a complex and expensive propulsion system. Thus, there exists a need for an engine for a VTOL aircraft that is low cost, enables a survivable aircraft, and provides the capability for high flight speeds of around 300 knots with a loiter speed capability of around 150 knots with stationary hover capability, as well.

U.S. Pat. No. 4,286,430 discloses a turbine engine with three spools: a low-pressure spool, an intermediate spool and a high-pressure spool. The high-pressure spool is mounted off axis, and typically transverse relative to the other spools. An intake scroll tube ducts the compressed air from the intermediate spool compressor to the high-pressure spool assembly while, similarly, an exhaust scroll tube ducts the exhaust from the high-pressure turbine assembly and to the intermediate pressure turbine assembly.

SUMMARY

In one general aspect, the present invention is directed to a turbine engine particularly suited for VTOL aircraft. The turbine engine may also be used in other types of craft, including other types of aircrafts, ground vehicles and ships. According to various embodiments, the core of the turbine engine includes two spools—a low pressure (LP) spool and a high pressure (HP) spool—where the LP spool is independently mounted remote to the HP spool. That is, the LP and HP spools may be separated such that they do not run on concentric shafts. The engine may be modulated for operation by a pair of diverter valve assemblies and through the fuel flow to the engine. As such, the power output from the engine can be modulated from high levels to low levels and vice versa through control of the airflow through the engine using the airflow diverter valving assemblies. In lift mode operation both the LP and HP spools may be operational, while during the forward flight cruise mode of operation the HP spool is operational and the LP spool may or may not be operational depending upon the power required for the flight condition. For HP spool only operation, the LP spool may be shut down using the diverter valving assemblies. The convertible configuration may be achieved by the valving-enabled modulation of the engine airflow direction to produce a characteristic for shaft power output for lift devices for the vertical lift mode to propulsive thrust output for forward flight mode. In an alternative embodiment, exhaust gas drive for lift devices may be used for vertical lift mode. The net effect, according to various embodiments, is to have a high turndown ratio of power between the lift and the cruise modes of operation of the aircraft, while maintaining a low level of fuel consumption.

According to various implementations, in a first mode of operation (e.g., the high power mode), the modulation diverter valve assembly directs a first variable amount of the combusted gas flow to the high-power turbine stage. In a second mode of operation (e.g., the low power or cruise mode), the modulation diverter valve assembly directs a second variable amount of the combusted gas flow to the low-power turbine stage. In addition, in the first mode of operation, the flow diverter valve assembly may direct inlet air to a low-pressure compression system of the low-pressure spool assembly, and, in the second mode of operation, the flow diverter valve assembly may divert inlet air away from the low-pressure compression system. When the engine transitions from the first mode to the second mode, the modulation diverter valve assembly may reduce the gas flow to the high-power turbine system so that eventually all of the gas flow is directed to the low-power turbine system.

In another general aspect, the present invention is directed to a craft (e.g., an aircraft, a ground vehicle or a ship) comprising the turbine engine.

FIGURES

Various embodiments of the present invention are described herein in conjunction with the following figures, wherein.

DETAILED DESCRIPTION

Various embodiments of the present invention are directed to a turbine engine that is particularly suited for VTOL aircraft. Such aircraft have a lift mode of operation where they lift off a landing surface and a forward flight cruise mode of operation where they cruise at high speeds (e.g., 300 knots). Enabled by the convertible turbine engine described below, the VTOL aircraft may use lift fans or rotors for vertical take-off and landing, and an ultra high bypass ratio embedded ducted fan/propulsor for cruise mode.

Figure 1:
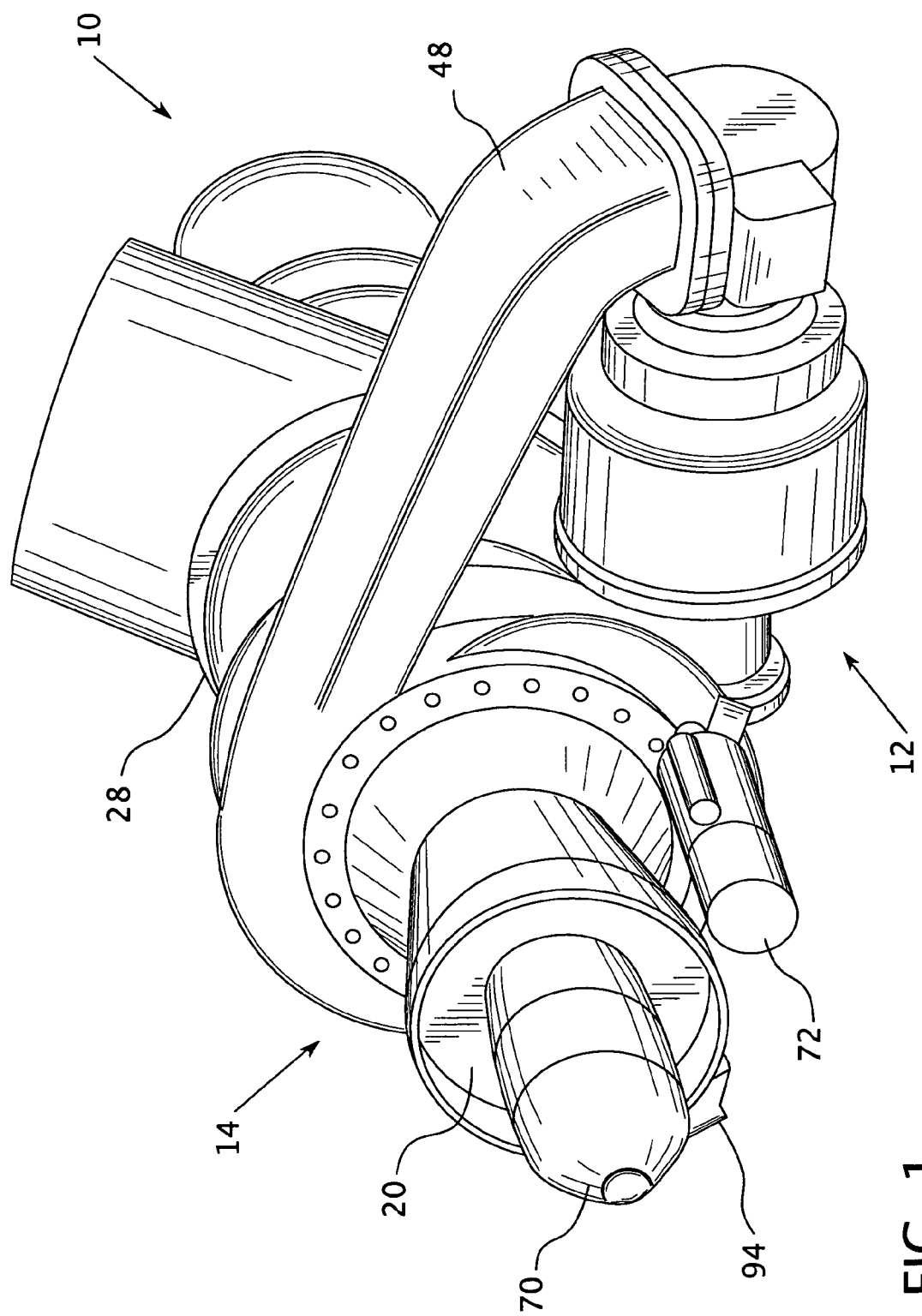
FIGS. 1 and 2 are diagrams of the turbine engine according to various embodiments of the present invention.
Figure 2:
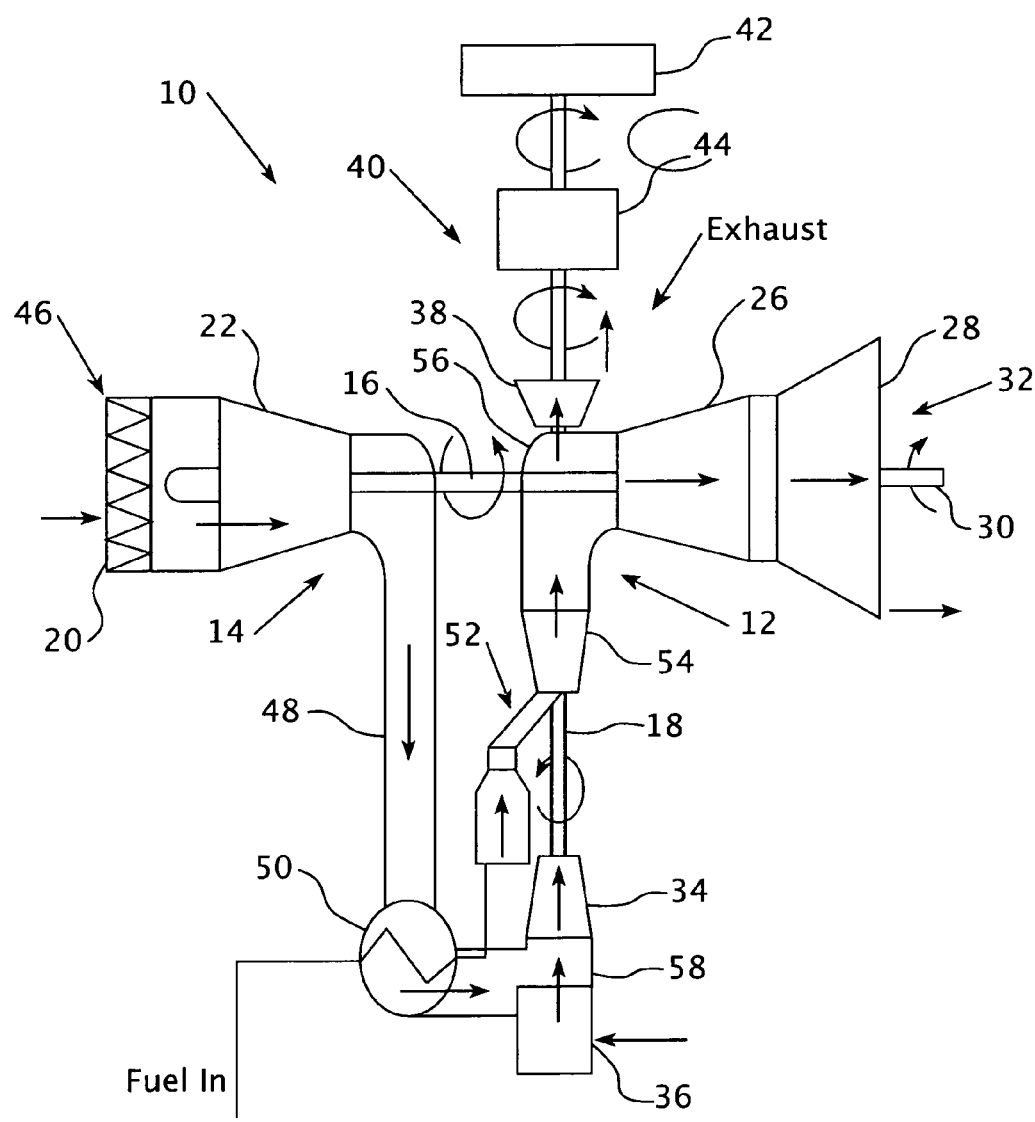

FIG. 1 is a simplified perspective view and FIG. 2 is a simplified schematic view of the turbine engine 10 according to various embodiments of the present invention. As depicted in these figures, the engine 10 may include at least both a High-Pressure (HP) spool assembly 12 and a Low-Pressure (LP) spool assembly 14. As described in more detail below, the two spool assemblies 12, 14 are preferably oriented along different axes. For example, the LP spool assembly 14 may be traversely oriented to the HP spool assembly 12. In the illustrated embodiment, as shown in FIG. 2, the LP spool assembly 14 is oriented along the horizontal axis while the HP spool 12 is aligned with the vertical axis. Other orientations are possible, such as parallel, although the spools preferably do not run on concentric shafts.

The spool assemblies 12, 14 may be contained in a housing (not shown). The LP spool assembly 14 may include an elongated tubular shaft 16 that extends longitudinally through the housing. The shaft 16 may be rotatably mounted to the housing by bearings located at, for example, both the front and rear of the shaft 16. A low-pressure compressor system 22 may be secured to the front end of the shaft 16 so that the low-pressure compressor system 22 is positioned downstream from an air intake 20. The low-pressure compression system 22 may comprise one or more low-pressure axial and/or radial compression stages. In addition, a low-pressure (LP) turbine system 26 and a power turbine system 28 may be secured to the opposite or rear end 30 of the LP shaft 16, immediately upstream from an exhaust outlet 32. Further, the power turbine stage 28 may be freely mounted to the LP spool 14.

The HP spool assembly 12 may also include an elongated tubular shaft 18 that is rotatably mounted to the housing by bearings. A high-pressure compressor system 34 may be secured to the shaft 18 adjacent an air inlet 36 for the HP spool 12. The high-pressure compression system 34 may comprise one or more low-pressure axial and/or radial compression stages. In addition, a high-pressure turbine system 54 may be secured to the HP shaft 18. According to one embodiment, a cruise propulsor 42 may be secured to the outlet end 40 of the HP shaft 18. The cruise propulsor 42 may be, for example, a propfan, a ducted fan or a propeller. A gearbox 44, shown in FIG. 2, may also be used for shaft speed reduction, if necessary. In other embodiments, rather than mechanically coupling the cruise propulsor 42 to the HP shaft 18, the cruise propulsor 42 may be aerodynamically coupled to the HP shaft 18 by a freely mounted power turbine 38 with efficient matchings, thereby eliminating the need for the gearbox 44.

Referring to FIG. 2, in a high power mode, air may enter the engine 10 through the low pressure air intake 20 and passes through a sand/dust separator 46, if necessary, before entering the LP compressor system 22. After compression, the air may pass through a scroll duct 48 and enter the HP compressor system 34.

Fuel may be distributed within a combustor 52, where the fuel is introduced with the air leaving the HP compressor system 34. In some embodiments, the fuel may enter through an intercooler 50, if necessary.

After combustion, exhaust may be expanded through a high-pressure turbine system 54 to drive the HP compressor system 34. The combusted flow (exhaust) then passes through a modulation diverter valve assembly 56, where the exhaust is diverted to the LP turbine system 26, which drives the LP compressor system 22. After the exhaust passes through the LP turbine system 26, it may be expanded through the high-power turbine system 28, extracting power to drive lift fans or lift rotors (not shown) so that the VTOL craft can operate in lift mode. A portion of the combusted air exiting the LP turbine system 26 may be diverted to the low-power turbine 38 to drive the cruise propulsor 42, which may be used in VTOL as an aft lift post. When the turbine engine 10 is used in craft besides a VTOL aircraft, the high-power turbine system 28 may be used to power other types of propulsion devices.

As the VTOL aircraft transitions from vertical lift to forward flight, the engine 10 preferably modulates from high power mode to a mid-power mode. In mid-power mode operation, both the LP spool assembly 14 and the HP spool assembly 12 preferably continue to operate. According to various embodiments, the fuel flow is reduced so that the rotational speed of each spool assembly slows. As power reduces by reducing the fuel flow, the transition power point is achieved where the modulation diverter valve assembly 56 begins to direct more exhaust gas from the HP turbine system 54 to the low-power turbine 38 and less gas flow to the LP turbine 26 and the high-power turbine system 28. The reduced gas flow from the modulation diverter valve assembly 56 causes the LP spool assembly 14 to reduce rotational speed further and finally stop. When the LP spool assembly stops, the engine 10 operates in a lower power mode or cruise mode.

In a low power mode or cruise mode, all of the LP turbomachinery components (e.g., LP turbine system 26 and LP compressor system 22) preferably come off-line and no longer participate in the engine operation. The modulation diverter valve assembly 56 may direct all the gas to the low-power turbine system 38 and close off the flow path that would normally supply the LP turbine system 26. A flow (or "spool inlet") diverter valve assembly 58 between the LP compressor system 22 and the HP compressor system 34 may then close off air flow from the LP compressor stage 22. As it does this, the flow diverter valve assembly 58 may open a flow path to the inlet 36, which is used to supply air to the engine 10 in cruise mode. In this mode, the HP spool assembly 12 is operated by itself, directing all exhaust gas flow to the low-power turbine stage 38.

Utilizing the intercooler 50 in the scroll duct 48 is an optional feature, but one which may provide more performance in terms of sizing the HP spool components and achieving better overall efficiency of the cycle for lower fuel consumption.

FIG. 1 also shows that the engine may include other conventional components, including, for example, an alternator 70, an oil pump 72, a FADEC (Full Authority Digital Engine Control) 94, etc.

Figure 3:
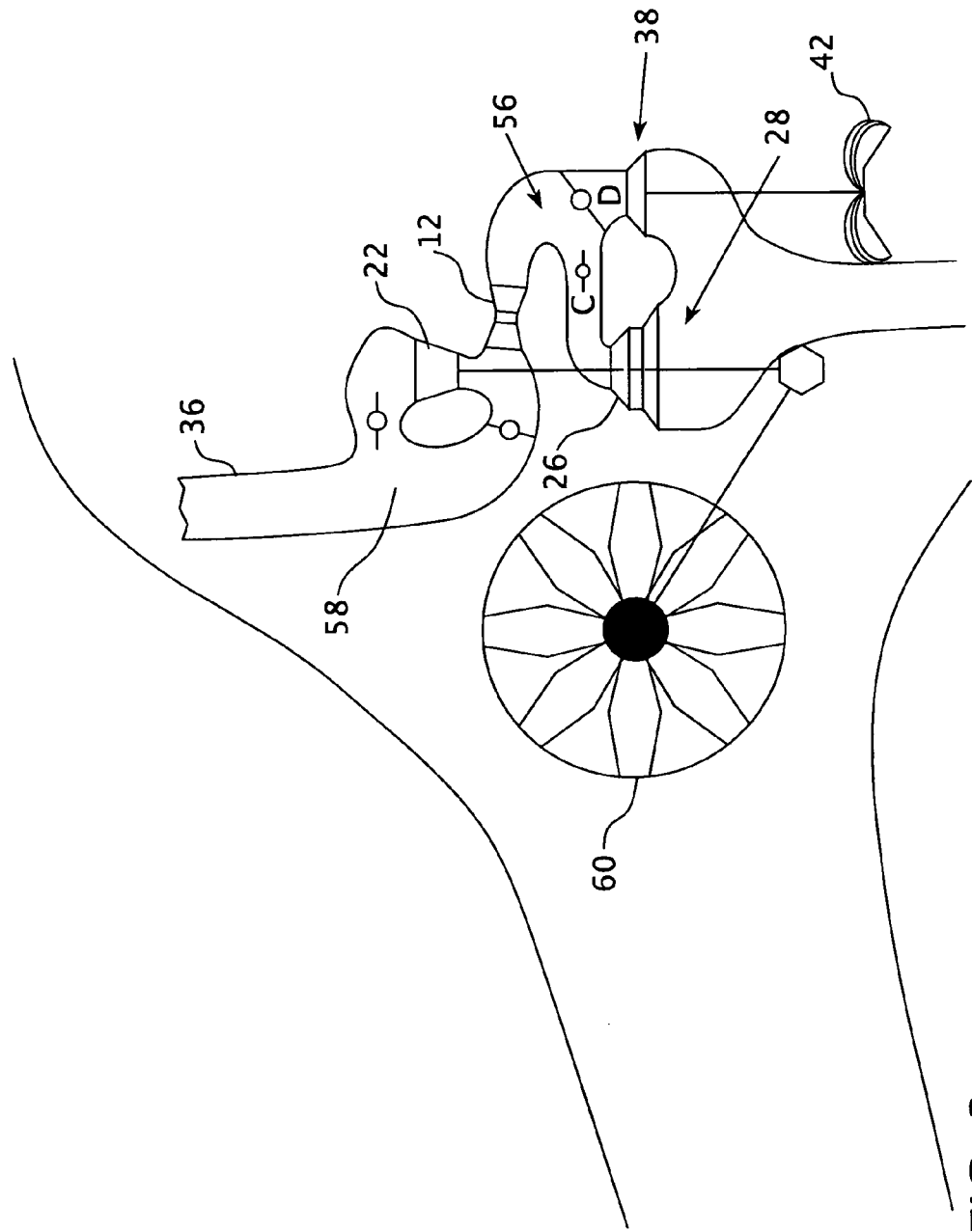
FIG. 3 is a diagram of the diverter valve assemblies of the turbine engine according to various embodiments of the present invention.

FIG. 3 illustrates the valving-enabled modulation according to various embodiments. This diagram depicts the valve configurations in lift (or high power) mode. As can be seen in this diagram, the flow diverter valve assembly 58 may comprise two valves A and B. The valves A and B may be butterfly or guillotine valves, for example. Similarly, the modulation diverter valve assembly 56 may comprise two valves C and D, which may also be butterfly or guillotine valves, for example. In the lift mode, as can be seen in the embodiment of FIG. 3, valve A is open and valve B is closed. Incoming air is then forced through the LP compressor system 22 and then to the HP spool 12. With valve C open and valve D closed, the gases are directed to the high-power turbine system 28 to provide power to the lift fan/rotors 60. In cruise (or lower power) mode, the configuration of the valves would be opposite. Incoming air, blocked by valve A, would go through valve B and then to the HP spool 12, thereby bypassing the LP compressor system 22. The gases would then go through valve D (since valve C is closed) to the low-power turbine system 38 to provide power to the cruise propulsor 42. In intermediate mode, the valves C and D both could be open (or partially open) to power each turbine system 26, 38. Preferably, valves A and B are not both open at the same time, or at least for only very small amounts of time.

In FIG. 3, the modulation diverter valve assembly 56 is shown as comprising two valves (C and D), although in other arrangements one valve with bi-channel flow diversion may only be necessary. Similarly, the flow diverter valve assembly 58 could comprise one valve with bi-channel flow diversion.

If a ducted fan is used for the forward flight cruise propulsor 42, a third inlet may be used for the fan flow. In any case (e.g., whether a propfan or a ducted fan is used as the cruise propulsor 42), the exhaust gas flows from the power turbines 26, 38 are preferably ducted to mix with the forward thrusted ducted fan or propfan exit flow in order to reduce the overall exhaust gas temperatures for a low observable signature level.

The valves of the modulation diverter valve assembly 56 and the flow diverter valve assembly 58 may be controlled by a control system, such as the FADEC 94.

Figure 4:
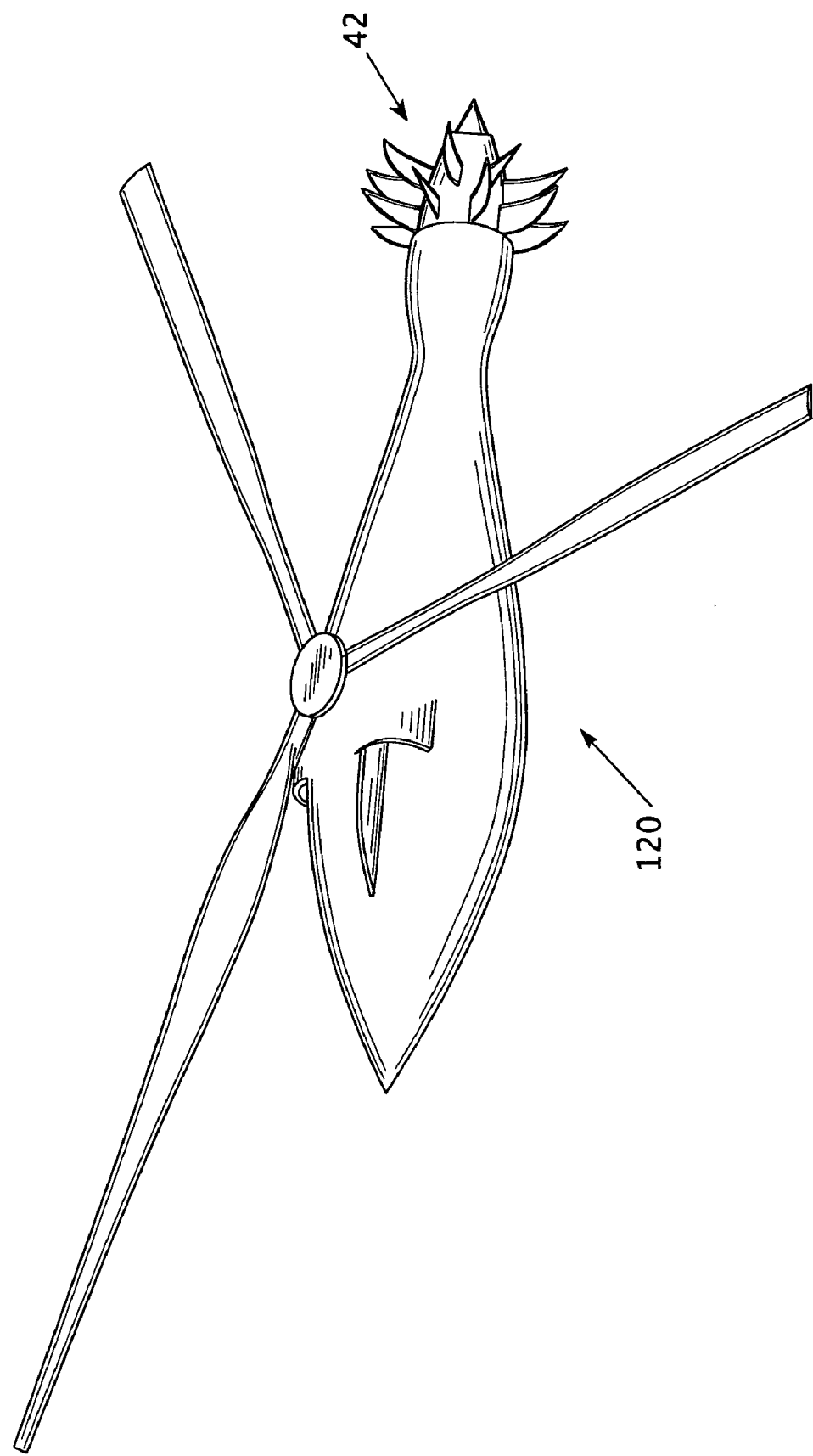
FIG. 4 is a diagram of a VTOL aircraft according to various embodiments of the present invention.

According to another aspect, various embodiments of the present invention are directed to a VTOL aircraft 120, such as shown in FIG. 4, that includes the turbine engine 10 described above. The cruise propulsor 42 of the turbine engine 10 is shown in the embodiment of FIG. 4. A substantial portion of the turbine engine 10 is obscured from view in FIG. 4 by the body of the VTOL aircraft 120.

Figure 5:
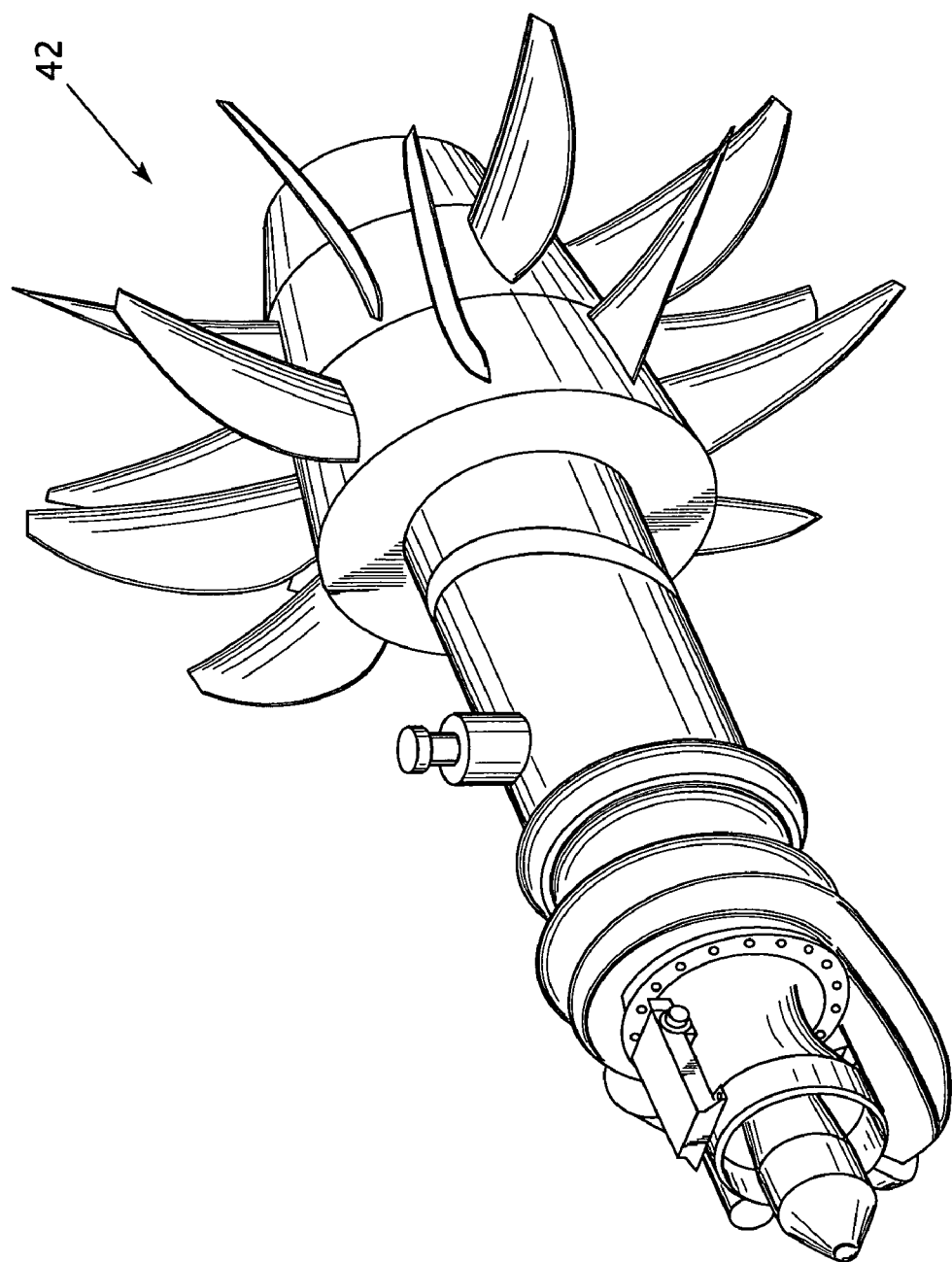
FIG. 5 is a diagram of a propfan cruise fan that may be utilized by the turbine engine according to various embodiments of the present invention.

FIG. 5 shows an embodiment of the exterior of a portion of the turbine engine 10 where the cruise propulsor 42 is a propfan.

The engine 10 may reverse the modes of operation going from the low power or cruise mode to the high power mode by actuating the modulation diverter valve assembly 56 and the flow diverter valve assembly 58. The LP spool assembly 14 will increase in speed as fuel flow is increased. The modulation diverter valve assembly 56 and the flow diverter valve assembly 58 will return to original positions when the high power mode is attained.

Although the turbine engine 10 has been described above for use in a VTOL aircraft, it should be recognized that the engine 10 may be used in other types of craft, including other types of aircraft as well as ground vehicles (e.g., humvees or tanks) and ships, as well stationary power installations.

While several embodiments of the engine 10 have been described, it should be apparent, however, that various modifications, alterations and adaptations to those embodiments may occur to persons skilled in the art with the attainment of some or all of the advantages of the invention. This application is intended to cover all such modifications, alterations and adaptations without departing from the scope and spirit of the present invention as defined by the appended claims.

What is claimed is:

1. A turbine engine comprising:
    a low-pressure spool assembly comprising a low-pressure turbine stage and a high-power turbine stage;
    a high-pressure spool assembly comprising a high-pressure turbine stage and a low-power turbine stage, wherein the low-pressure spool assembly and the high-pressure spool assembly are oriented along different axes; and
    a modulation diverter valve assembly for modulating combusted gas flow from the high-pressure turbine stage of the high-pressure spool assembly to the high-power turbine stage of the low-pressure spool assembly and low-power turbine stage of the high-pressure spool assembly based on a mode of operation of the turbine engine.

2. The turbine engine of claim 1, wherein the low-pressure spool assembly comprises a low-pressure compressor and the high-pressure spool assembly comprises a high pressure compressor, and wherein the turbine engine further comprises a flow diverter valve assembly for directing inlet air flow to the low-pressure compressor and the high pressure compressor based on the mode of operation of the turbine engine.

3. The turbine engine of claim 2, wherein:
    in a first mode of operation, the modulation diverter valve assembly is for directing combusted gas flow to the high-power turbine stage;
    in a second mode of operation, the modulation diverter valve assembly is for directing combusted gas flow to the low-power turbine stage; and
    in a third mode of operation, the modulation diverter valve assembly is for directing combusted gas flow to both the low-power turbine stage and the high-power turbine stage.

4. The turbine engine of claim 3, wherein:
    in the first mode of operation, the flow diverter valve assembly is for directing inlet air to the low-pressure compressor of the low-pressure spool assembly; and
    in the second mode of operation, the modulation diverter valve assembly is for directing all of the combusted gas to the high-power turbine stage and the flow diverter valve assembly is for closing off air flow to the low-pressure compressor.

5. The turbine engine of claim 4, wherein the modulation diverter valve assembly, when the engine transitions from the first mode to the second mode of operation, is for reducing the gas flow to the high-power turbine stage so that eventually all of the gas flow is directed to the low-power turbine stage.

6. The turbine engine of claim 5, wherein the modulation diverter valve assembly comprises one valve with bi-channel flow diversion.

7. The turbine engine of claim 5, wherein the modulation diverter valve assembly comprises at least two valves.

8. The turbine engine of claim 1, wherein the modulation diverter valve assembly comprises one valve with bi-channel flow diversion.

9. The turbine engine of claim 1, wherein the modulation diverter valve assembly comprises at least two valves.

10. The turbine engine of claim 7, wherein the flow diverter valve assembly comprises at least two valves.

11. The turbine engine of claim 1, wherein the low-pressure spool assembly is oriented non-concentric to the high-pressure spool assembly.

12. The turbine engine of claim 5, wherein the low-pressure spool assembly is oriented non-concentric to the high-pressure spool assembly.

13. The turbine engine of claim 5, further comprising a cruise propulsor coupled to the high-pressure spool assembly.

14. The turbine engine of claim 13, wherein the cruise propulsor is mechanically coupled to the high-pressure spool assembly.

15. The turbine engine of claim 13, wherein the cruise propulsor is aerodynamically coupled to the high-pressure spool assembly.

16. The turbine engine of claim 13, wherein the cruise propulsor comprises at least one of a cruise fan, a propfan or a propeller.

17. The turbine engine of claim 15, further comprising:
    a scroll duct for ducting air from the low-pressure compressor to the high-pressure compressor; and
    an intercooler in the scroll duct for introducing fuel.

18. A craft comprising a turbine engine, wherein the turbine engine comprises:
    a low-pressure spool assembly comprising a low-pressure turbine stage and a high-power turbine stage;
    a high-pressure spool assembly comprising a high-pressure turbine stage and a low-power turbine stage, wherein the low-pressure spool assembly and the high-pressure spool assembly are oriented along different axes; and
    a modulation diverter valve assembly for modulating combusted gas flow from the high-pressure turbine stage of the high-pressure spool assembly to the high-power turbine stage of the low-pressure spool assembly and low-power turbine stage of the high-pressure spool assembly based on a mode of operation of the turbine engine.

19. The craft of claim 18, wherein the low-pressure spool assembly comprises a low-pressure compressor and the high-pressure spool assembly comprises a high pressure compressor, and further comprising a flow diverter valve assembly for directing inlet air flow to the low-pressure compressor and the high pressure compressor based on the mode of operation of the turbine engine.

20. The craft of claim 19, wherein the high-pressure spool assembly comprises a freely mounted low-power turbine assembly.

21. The craft of claim 19, wherein:
in a first mode of operation, the modulation diverter valve assembly is for directing combusted gas flow to the high-power turbine stage;
in a second mode of operation, the modulation diverter valve assembly is for directing combusted gas flow to the low-power turbine stage; and
in a third mode of operation, the modulation diverter valve assembly is for directing combusted gas flow to both the low-power turbine stage and the high-power turbine stage.

22. The craft of claim 21, wherein:
in the first mode of operation, the flow diverter valve assembly is for directing inlet air to the low-pressure compressor of the low-pressure spool assembly; and
in the second mode of operation, the modulation diverter valve assembly is for directing all of the combusted gas to the high-power turbine stage and the flow diverter valve assembly is for closing off air flow to the low-pressure compressor.

23. The craft of claim 22, wherein modulation diverter valve assembly, when the engine transitions from the first mode to the second mode of operation, is for reducing the gas flow to the high-power turbine stage so that eventually all of the gas flow is directed to the low-power turbine stage.

24. The craft of claim 18, wherein the craft comprises a VTOL aircraft.

25. The craft of claim 18, wherein the craft is selected from the group consisting of an aircraft, a ground vehicle, and a ship.

26. A turbine engine comprising:
a low-pressure spool assembly comprising a low-pressure compressor, a low-pressure turbine stage, and a high-power turbine stage;
a high-pressure spool assembly comprising a high-pressure compressor, a combustor, a high-pressure turbine stage, and a low-power turbine stage, wherein the low-pressure spool assembly and the high-pressure spool assembly are oriented along different axes;
a modulation diverter valve assembly for modulating combusted gas flow from an exit of the high-pressure turbine stage of the high-pressure spool assembly to the high-power turbine stage of the low-pressure spool assembly and the low-power turbine stage of the high-pressure spool assembly based on a mode of operation of the turbine engine, wherein, in a high-power mode of operation, the modulation diverter valve assembly is for directing a first variable amount of the combusted gas flow to the low-pressure turbine stage and, in a low power mode of operation, is for directing a second variable amount of the combusted gas flow to the low-power turbine stage; and
a flow diverter valve assembly for directing inlet air flow to the low-pressure compressor and the high pressure compressor based on the mode of operation of the turbine engine, wherein, in the high-power mode of operation, the flow diverter valve assembly is for directing inlet air to the low-pressure compression system of the low-pressure spool assembly, and, in the low-power mode of operation, the flow valve assembly is for diverting inlet air to the high-pressure compression system.

27. The turbine engine of claim 1, further comprising:
a cruise propulsor coupled to the high-pressure spool assembly; and
a lift fan coupled to the low-pressure spool assembly.

28. The turbine engine of claim 1, further comprising:
a cruise propulsor coupled to the high-pressure spool assembly; and
a lift rotor coupled to the low-pressure spool assembly.

29. A turbine engine comprising:
a low-pressure spool assembly comprising a first low-pressure turbine stage and a low-pressure spool power turbine stage, and wherein the low-pressure spool assembly comprises a low-pressure compressor;
a high-pressure spool assembly comprising a first high-pressure turbine stage and a high-pressure spool power turbine stage, wherein the low-pressure spool assembly and the high-pressure spool assembly are oriented along different axes, and wherein the high-pressure spool assembly comprises a high pressure compressor;
a combustor for combusting inlet air flow to generate a combusted gas, which is expanded through the first high-pressure turbine stage;
a modulation diverter valve assembly for modulating combusted gas flow from the first high-pressure turbine stage to the low-pressure spool power turbine stage and the high-pressure spool power turbine stage based on a mode of operation of the turbine engine; and
a flow diverter valve assembly for directing inlet air flow to the low-pressure compressor and the high pressure compressor based on the mode of operation of the turbine engine.

\* \* \* \* \*